W. E. SMALL.
COMBINED TRIMMING AND CHANNELING MACHINE.
APPLICATION FILED OCT. 9, 1907.

914,318.

Patented Mar. 2, 1909.
7 SHEETS—SHEET 1.

W. E. SMALL.
COMBINED TRIMMING AND CHANNELING MACHINE.
APPLICATION FILED OCT. 9, 1907.

914,318.

Patented Mar. 2, 1909.
7 SHEETS—SHEET 2.

Witnesses
Oliver W. Holmes
E. B. McBath

Inventor
William E. Small
By Meara & Brock
Attorney

W. E. SMALL.
COMBINED TRIMMING AND CHANNELING MACHINE.
APPLICATION FILED OCT. 9, 1907.

914,318.

Patented Mar. 2, 1909.
7 SHEETS—SHEET 3.

W. E. SMALL.
COMBINED TRIMMING AND CHANNELING MACHINE.
APPLICATION FILED OCT. 9, 1907.

914,318.

Patented Mar. 2, 1909.
7 SHEETS—SHEET 5.

Witnesses
Oliver W. Holmes

Inventor
William E. Small,
By O'Meara & Broch
Attorney

W. E. SMALL.
COMBINED TRIMMING AND CHANNELING MACHINE.
APPLICATION FILED OCT. 9, 1907.

914,318.

Patented Mar. 2, 1909.
7 SHEETS—SHEET 6.

Witnesses
Oliver W. Holmes
C. B. McBath

Inventor
William E. Small,
By O'Meara & Burch
Attorneys

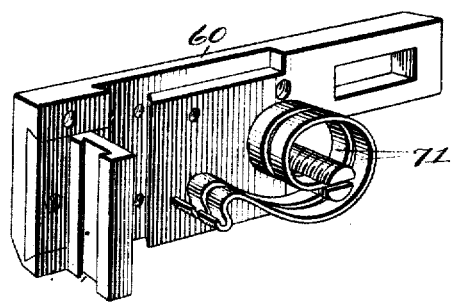
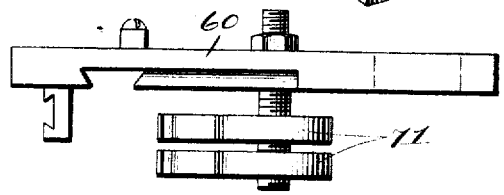
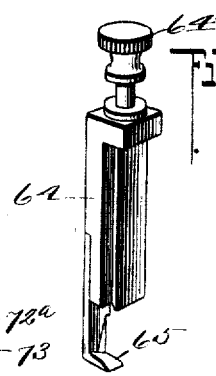
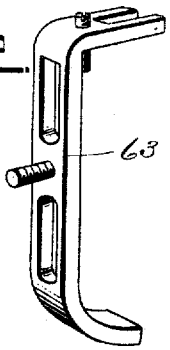
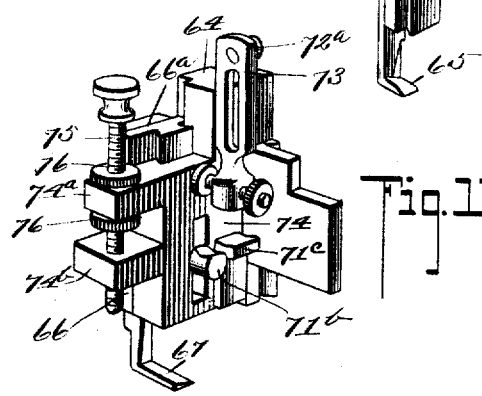
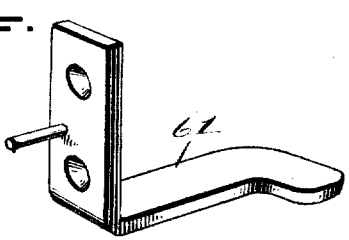

UNITED STATES PATENT OFFICE.

WILLIAM E. SMALL, OF BROOKLYN, NEW YORK, ASSIGNOR OF ONE-HALF TO HERMAN HOLINER, OF BROOKLYN, NEW YORK.

COMBINED TRIMMING AND CHANNELING MACHINE.

No. 914,318.      Specification of Letters Patent.      Patented March 2, 1909.

Application filed October 9, 1907. Serial No. 396,622.

*To all whom it may concern:*

Be it known that I, WILLIAM E. SMALL, a citizen of the United States, residing in Brooklyn, in the county of Kings and State of New York, have invented a new and useful Improvement in a Combined Trimming and Channeling Machine, of which the following is a specification.

This invention relates to a device for trimming and channeling shoe soles and the object of the invention is a device of this kind which will perform the work as nearly automatically as possible and which will trim the outer edges of the sole as they are cut and which will also channel out the inner surface of the shoe sole at the same time that the trimming operation is performed, thus preparing the sole at one operation for use in connection with the vamp and foxing.

The invention also includes means for adjusting the different cutting blades employed so that the blades may be adjusted for the work desired of them either simultaneously or independently of the other.

The invention also includes automatic means for regulating the action of the cutting blades.

The invention also consists of the novel features of construction hereinafter fully described, pointed out in the claims and shown in the accompanying drawings, in which—

Figure 1:
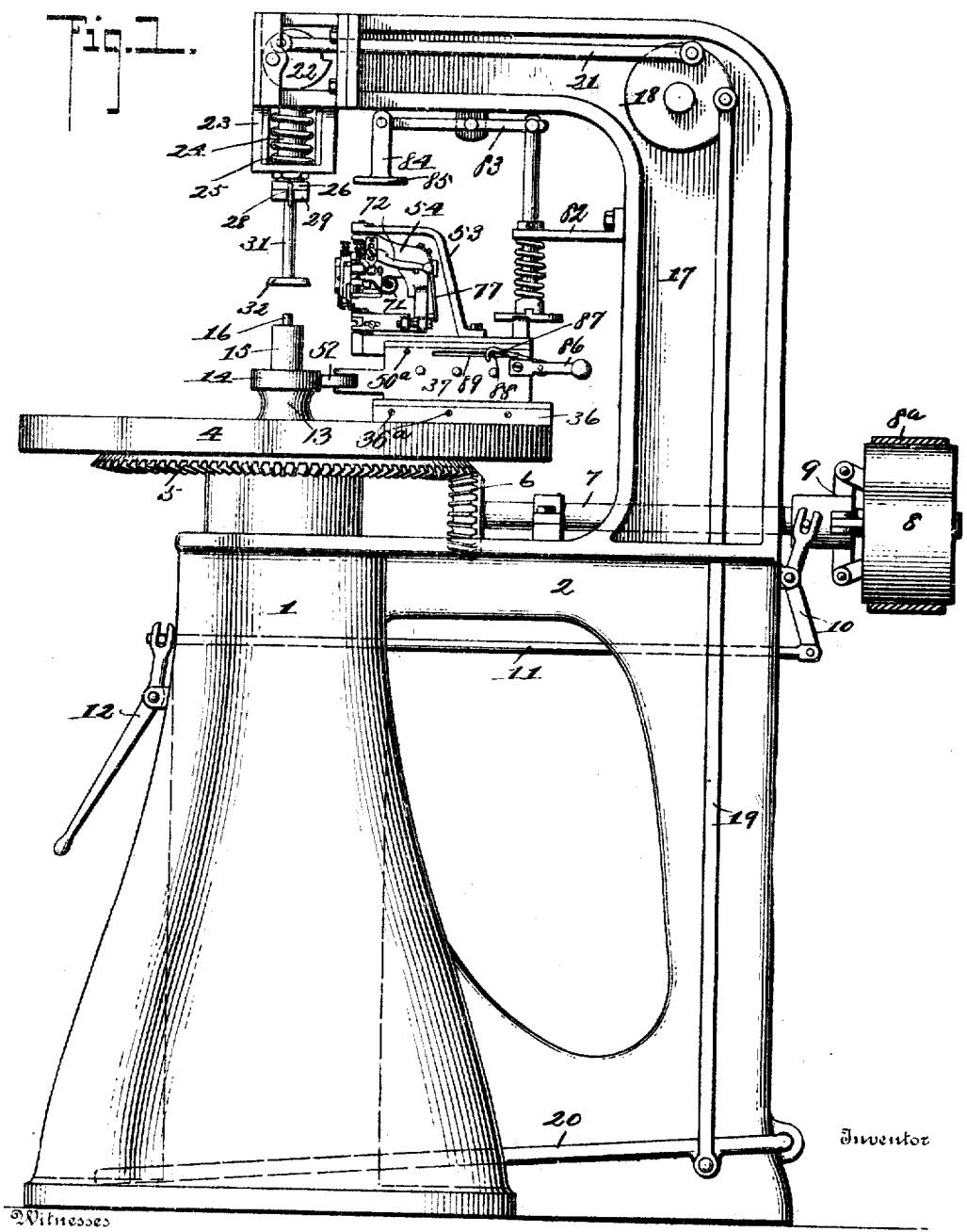
Figure 2:
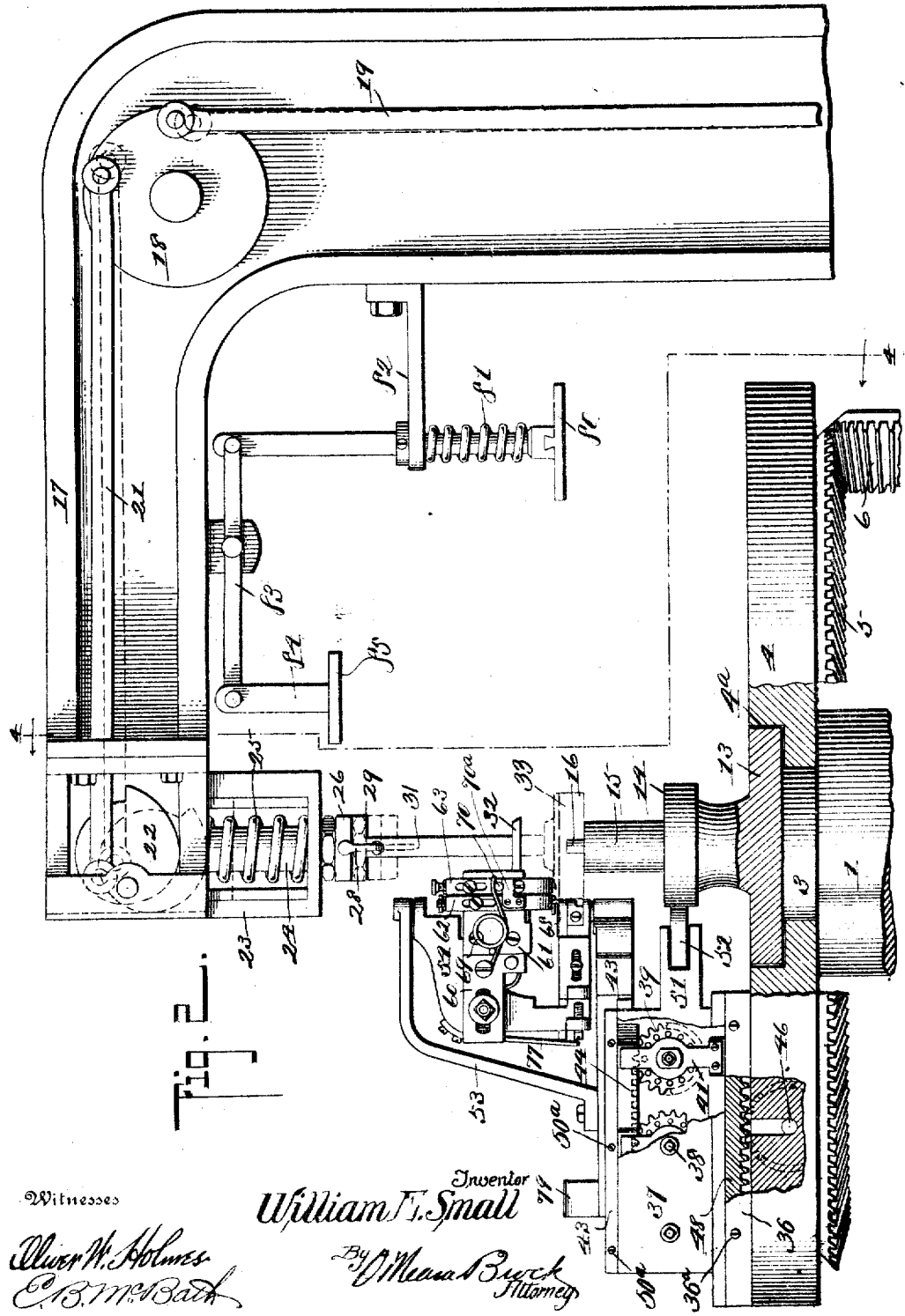
Figure 3:
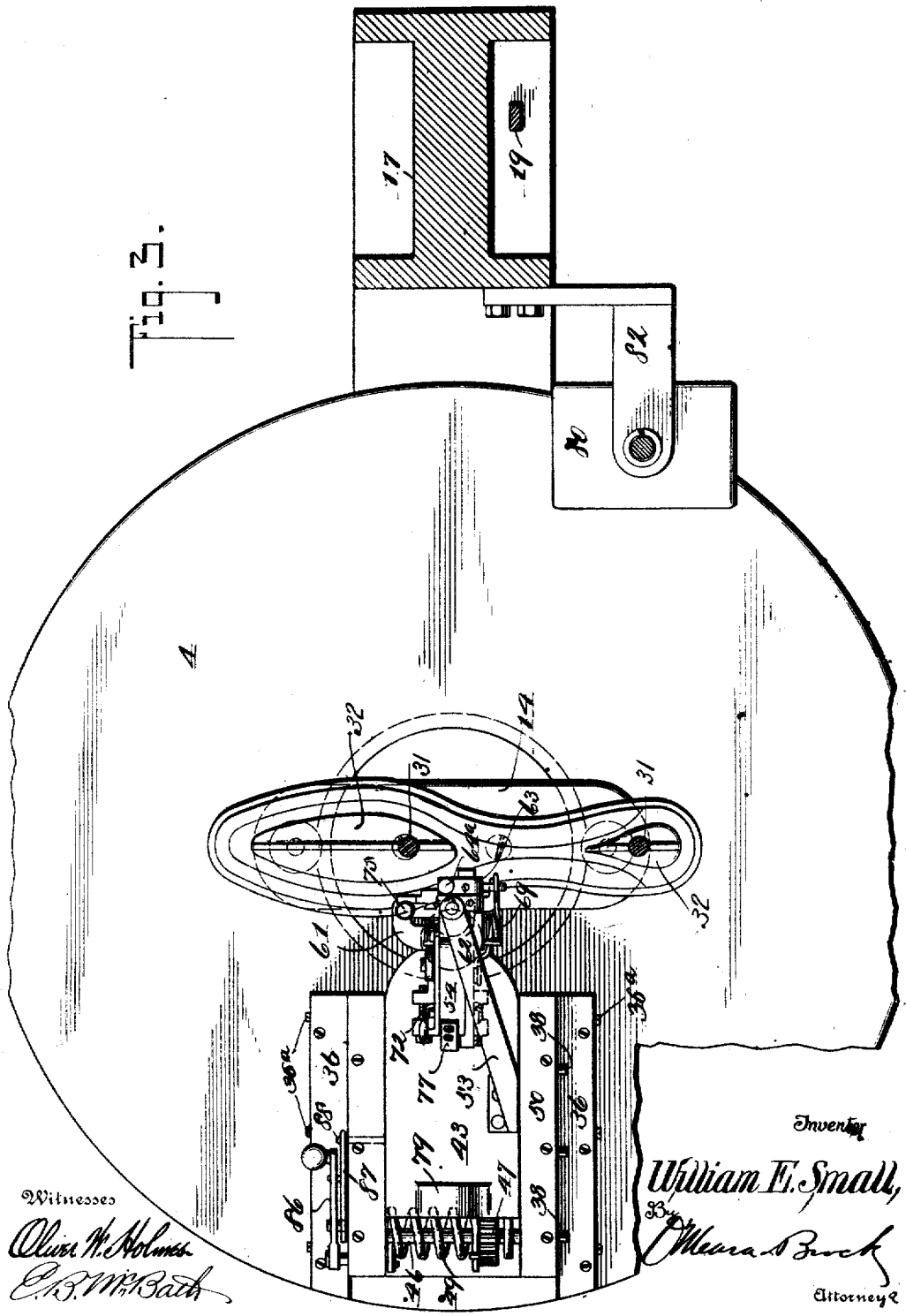
Figure 4:
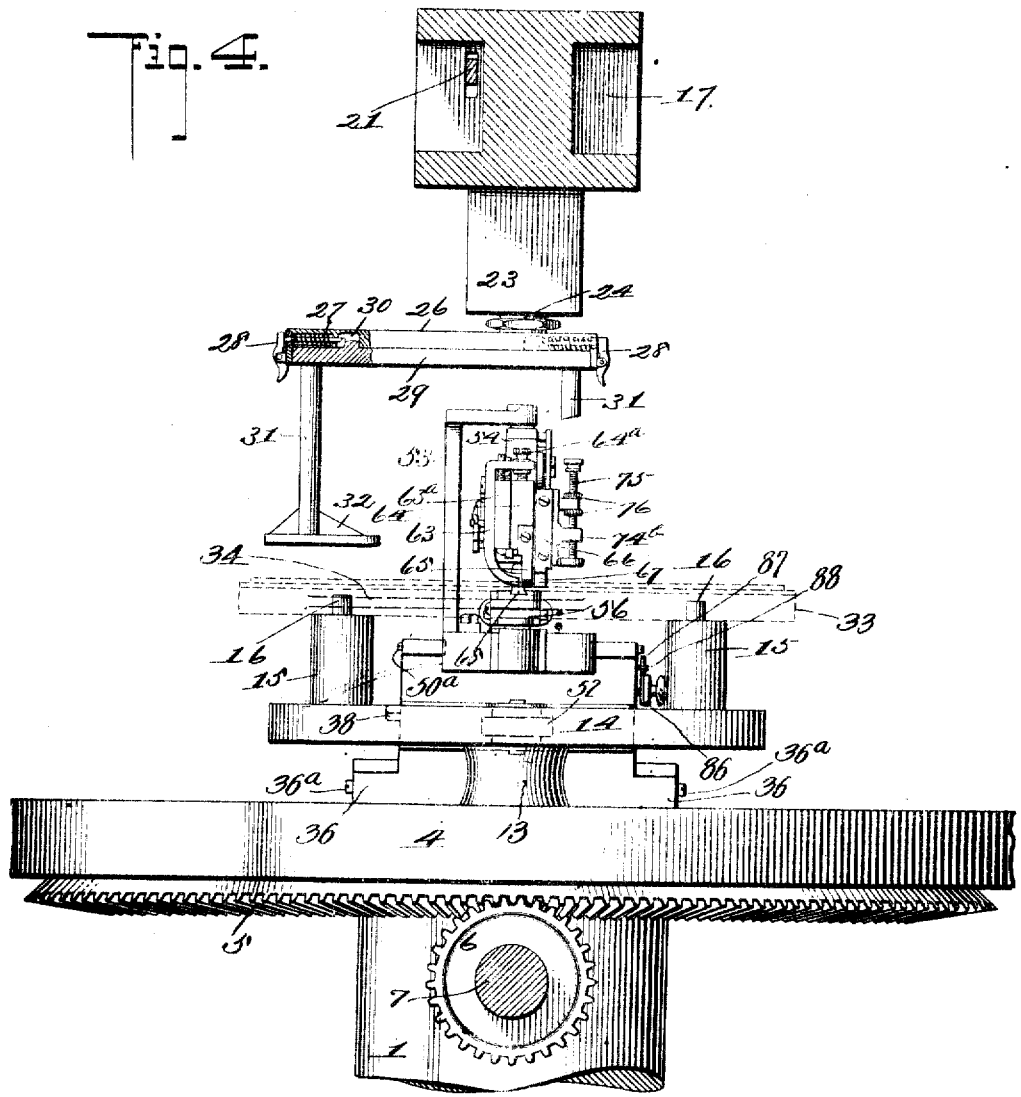
Figure 5:
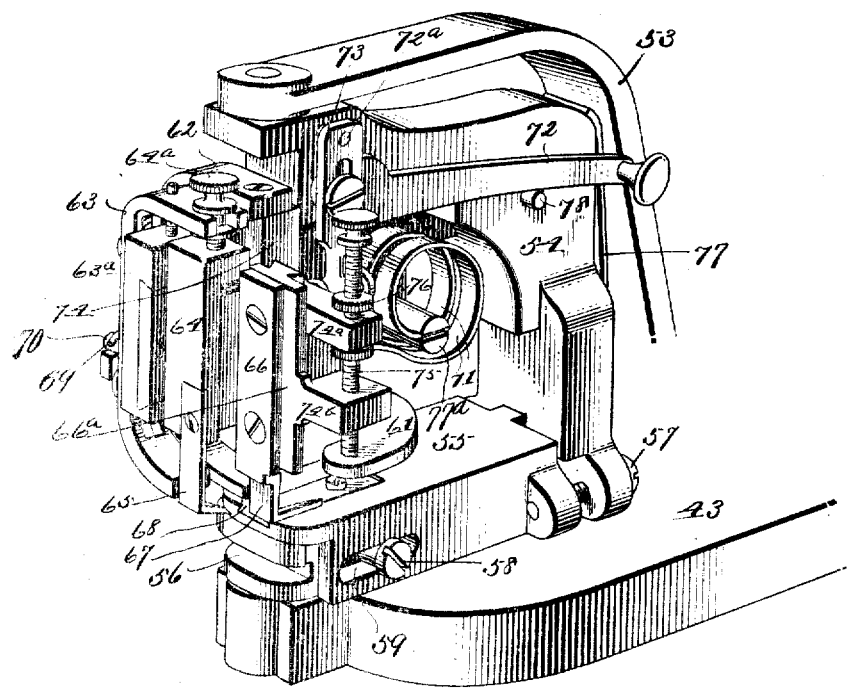
Figure 6:
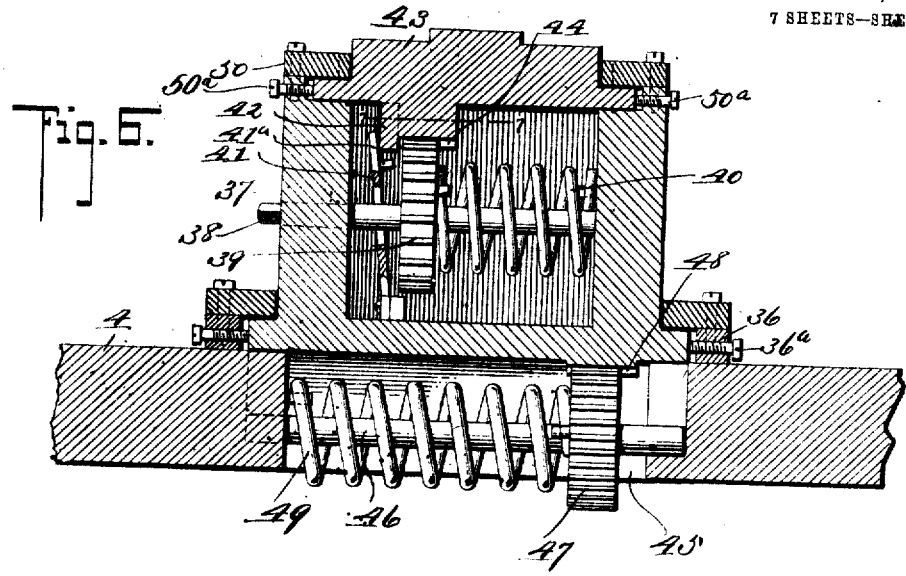
Figure 7:
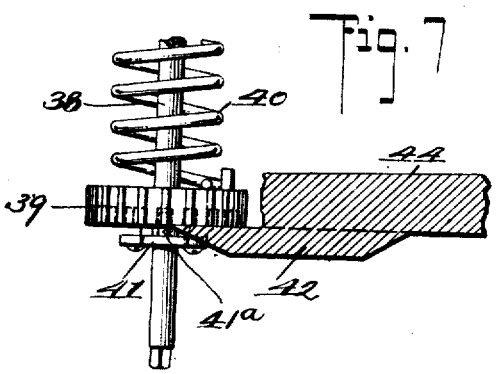
Figure 8:
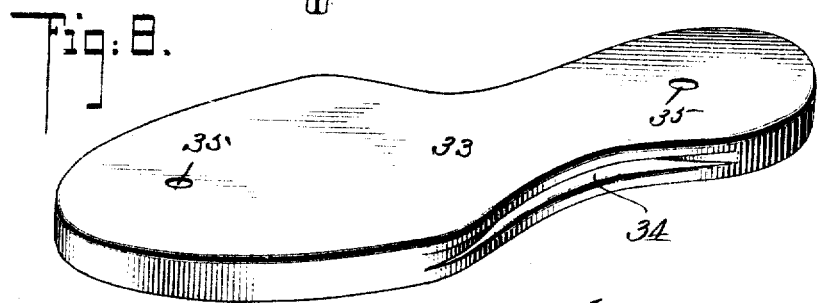

Figure 1 is a side elevation of the complete machine, a drive belt being shown in section. Fig. 2 is an enlarged detail elevation, partly broken away, and parts being in section, showing cutting mechanism in position, a pattern and blank being shown in dotted lines. Fig. 3 is a plan view of a rotatable table and the cutting mechanism, a portion of the table being broken away and parts of the frame and certain pins being shown in section. Fig. 4 is a sectional view on the line 4—4 of Fig. 2. Fig. 5 is a detail perspective view of a pivoted frame and the cutting mechanism carried thereby. Fig. 6 is an enlarged detail sectional view showing a portion of a rotatable table in section, and showing a transverse section through a casing having a sliding top, said casing being carried by the table. Fig. 7 is a detail sectional view of the line 7—7 of Fig. 6, and Fig. 8 is an enlarged perspective view of a pattern. Figs. 9, 10, 11, 12, and 13 are detail perspective views of parts carried by a swinging frame detached therefrom. Figs. 14 and 15 are detail perspective views of parts of the cutting mechanism carried by the pivoted frame.

In these drawings 1 represents an upright standard which carries at one side a cast metal frame 2. The upper end of the standard 1 is reduced as at 3 and a circular rotatable table 4 is mounted upon the upper end of the standard being centrally apertured to receive the reduced portion 3. This table is provided upon its end side with a gear ring 5 which meshes with a bevel pinion 6 carried upon the inner end of the shaft 7 upon the outer portion of which is mounted loosely a pulley 8 driven by a plate 8ª. A clutch 9 is provided for the purpose of locking the shaft 7 to the pulley 8 and said clutch is operated by means of an angled lever 10, operating rod 11 pivotally connected to the end of the lever and shifted by a pivoted handle 12. The table 4 is also centrally cut out as shown at 4ª and in this cutout portion is loosely arranged a circular disk 13 which rests upon the top of the reduced portion 3 of the standard 1, and remains stationary, as the table 4 revolves about it. The disk 13 carries an elongated platform 14 which is provided adjacent its opposite end with two upright posts 15 reduced at their ends to form upright projecting pins 16.

The frame 2 supports an angled I-beam 17, the upper end of which overhangs the platform 14. Upon one side and in the angle of the beams is mounted a rotatable disk 18 to which is pivotally connected the upper end of a link 19, the lower end of which is pivotally connected to a foot treadle 20. There is also pivoted to the disk 18 a rod 21 which is also pivoted eccentrically to a pivoted cam 22 carried by the overhanging portion of the beam 17. Depending over this portion of the beam is a casing 23 in which works a plunger 24 held normally in raised position by a coil spring 25. This plunger carries at its lower end, which projects downwardly through the casing 23, a plate 26 which is raised at its ends and in the recesses works spring pressed inwardly extending bolts 27 provided at their outer ends with pivoted thumb pieces 28. A coöperating plate 29 carries upon its upper face keepers 30 which extend into the recesses of the plate 26 and which engage normally the bolts 27. By pressing upon the lower ends of the thumb pieces 28, the bolts can be disengaged from the keepers and the plates 29 removed. The plate 29 carries adjacent each end a depending rod 31 which is provided at its lower end with a foot piece or shoe 32. A pattern 33 is recessed longitudinally upon its sides adjacent the instep portion as shown at 34 and is provided with apertures 35 which receive the pins 16 of the posts 15. Guide plates 36 are arranged radially upon the table 4 and while said plates could each be constructed in one piece and inwardly angled, I have shown each of said plates as being formed in two sections, the uppermost extending inwardly as shown in Fig. 6. A slidable casing 37 moves between these plates being held against vertical movement by the uppermost sections and being held against lateral movement by the uppermost sections and by adjusting screws 36ª. The casing 37 is provided with a plurality of transverse shafts 38 upon each of which is keyed a gear wheel 39 and about which is placed a coil spring 40 which is secured at one end to the casing and at the opposite end to the gear wheel 39, said gear wheel being slidable on the shaft.

Adjacent each gear wheel is placed a leaf spring 41 fixed at its lower end and having a projecting pin 41ª which is normally adapted to fit within one of a number of suitable sockets formed in the side of the wheel as shown in Fig. 2. When the pins 41ª are in engagement with sockets of the gear wheel 39, the said gear will be locked against rotation upon the shaft. The springs 41 are pushed outwardly and the pins disengaged from the sockets and the gears unlocked by means of a cam block 42 beveled at each end so that it will enter between the gear wheels and the springs. This cam lock is carried by a slidable top 43 of the casing 37, the said top being moved upon the casing and independent of movement of the casing by engagement of the gear wheels 39 with the rack bar 44 carried by the under side of the top 43. A portion of the table 4 beneath the casing 37 is cut out as shown at 45 and in this cutout portion is a fixed shaft 46 which carries a gear wheel 47 which engages a rack bar 48 formed upon the under side of the casing 37. A coil spring 49 encircles this shaft and is fastened at one end to the table 4 and at the opposite end to the gear 47. The top 43 is held in position upon the casing 37 by guide strips 50 and set screws 50ª, the general construction being substantially the same as that of the guide plates 36, already described. At its inner end the casing 37 carries an inwardly projecting bifurcated arm 51 in which is horizontally mounted projecting rollers 5 which rollers engage the sides of the platform 14 following said sides for a purpose which will hereafter appear.

The top 43 previously described, carries an upwardly and inwardly extending arm 53. A frame 54 is pivotally mounted between the one free end of the arm 53 and the inner end of the top 43, and it will be obvious that as the arm 53 is also carried by this top, movement of the top upon the casing 37 will cause a corresponding movement of the frame 54. It will be further remembered that the casing 37 is placed radially upon the table, and that the top 43 has a longitudinal movement with respect to said casing and consequently has a movement with respect to the table 4 upon a radial line of said table.

The lower portion of the frame 54 is formed of a horizontal block 55 which slides upon the top 43 being adjustable with respect to the main portion of the frame to which it is connected by a loose tenon and mortise joint and by suitable adjusting screws 57 which work through suitable lugs carried respectively by the upright portion of the frame 54 and the block 55. The forward end of this block is also provided with a sliding bifurcated block 56 thereby forming projecting lips movable in advance of the block 55 and clamped in their adjusted position by a set screw 58 which works through a slot 59 formed in the sides of the block 55, the block 56 being inserted and working within a suitable recess formed in the free end of the said block 55. Upon one side of the frame 54 is held an adjustable plate 60 which carries a finger 61, the said finger being secured by screws to the outer face of the plate 60 and then being bent to pass beneath and transversely to said plate, the free end of the finger 61 being bent forwardly and extending upwardly to and upon the opposite side of the frame 54, as shown most clearly in Figs. 2 and 5, where views of different portions of the said finger are shown. The plate 60 also carries presser feet 62 and 63, respectively, the upper ends of which overhang the top of the plate and the lower ends of which curve under the plate. Both of these feet are adjustable vertically and their lower ends coöperate with certain cutters to be hereafter referred to.

Working adjustably and vertically upon the side of the plate 60 opposite the bracket 63 is a cutter block 64 adjusted with respect to said plate by an adjusting screw 64ª which works through the overhanging top portion of the bracket 63, and the lower end of the cutter block 64 carries a downwardly and inwardly extending cutter 65 arranged adjacent to and transverse to the lower end of the bracket 63. A cutter block 66 provided with a cutter 67 is carried by a vertically sliding block 66ª. A cutter 68 extends upwardly from the block 55, the lower end of the bracket 62 forming a guard for said cutter. The shape and action of this cutter will be described more fully.

A spring 69 is secured at one end to the outer face of the plate 60 and is coiled between its ends, the free end resting upon a pin 70 carried by the bracket 63, the said pin also bearing upon an angled arm secured to the bracket 62 and extending transversely across the bracket 63, and beneath the pin 70. Upon the opposite side of the frame 54, over the plate 61 is arranged two stiff springs 71, one end of each spring being firmly held in a bifurcated screw passed through the plate 60 while the free ends of said springs bear upon pins 71$^b$, carried by the block 66$^a$ and 71$^c$ carried by an extension 74 of the block 62, said extension being provided with suitable vertical dove-tailed grooves in which the block 66$^a$ slides. An operating cam lever 72 is pivotally mounted upon the side of the frame 54 opposite the plate 60, the inner cam portion of the lever bearing when the lever is lifted upwardly, upon a pin 72$^a$ carried by a vertically movable link 73 secured to the extension 74. This extension is provided with outwardly extending lugs 74$^a$ and a parallel lug 74$^b$ extends outwardly from one side of the block 66$^a$, and a threaded rod 75 works through both of said lugs, the lower end of the rod bearing upon the forwardly extending portion of the bracket 61. Milled nuts 76 work upon the rod 75 above and below the lug 74$^a$, through which the rod 75 passes loosely. A strong lift spring 77 is secured at its upper end upon the back of the frame 54 and the lower free end of this spring rests against the end of the tenon of the block 55. A lever 72 normally rests in engagement with a stop pin 78. When this lever is thrown upwardly the action of its cam portion lifts the link 73 thereby lifting the cutters 65 and 67 into inoperative position.

It will be obvious that by running upwardly upon the threaded rod 75 the upper milled end 76, there will be no upward movement of the cutter 67 until the lug 74$^a$ comes into contact with said nut, the said rod passing loosely through the lug 74$^a$ and being threaded through the lug 74$^b$. It will also be obvious that if the cutter 65 is given sufficient lead over the cutter 67 there will be no lifting movement of the last mentioned cutter when the lever 72 is lifted. Consequently either both or only one of the cutters may be thrown into inoperative position by the lifting of said lever. This lever is lifted before the cutting operation commences and the table 4 starts its rotation about the work with the lever 72 in uplifted position.

To automatically throw the lever down and permit the cutters to drop into operative position at exactly the proper time, I place upon the top 43 of the casing 37 a cam 79 which at the proper point of rotation of the table engages a vertical movable foot 80 normally held down by a spring 81 and working through a bracket 82 carried by the beam 17. This foot is pivotally connected to a lever 83 which is pivoted between its ends and which carries at the end opposite the foot 80, a depending bar 84 having a shoe 85 in position as it descends to strike the uplifted lever 72 and to throw the same downwardly. This places the cutters in operative position at exactly the proper position with respect to the pattern upon which the work has been made. This assures that the work of channeling and trimming which commenced at the proper point upon the sole will be correctly started without regard to the relative position of the frame and the pattern when rotation of the table 4 commenced.

It will also be obvious from the drawings that the platform 14 above which the pattern is supported guides the cutting device about the said pattern, as the table 4 rotates and the roller 52 reaches a position upon the guiding platform 14 corresponding to the heel or toe of the pattern and passes around the same, the casting 37 will be forced radially toward the periphery of the table and during this movement of the casing, rotation of the gear heel 47 will wind the spring 46 and upon completion of the heel or toe turning movement, the unwinding of the said spring will cause the casing to move radially and inwardly. In a like manner the cover 43 will be caused to move downwardly and inwardly with respect to the center of the table by reason of engagement with the pattern 33 of the movable portion 56 of the block 55 and as the pattern is recessed as shown at 34 adjacent the instep one lip of the block 56 will slide on the face of the pattern which the other lip will project into the said recess thus permitting the cutter blades to operate at a point further distant from the edge of the sole.

It will also be obvious that the sliding movement of the cover 43 upon the casing will also rotate the gear wheels 39 thus winding the spring 40, the said gear wheels will be locked against rotation by the springs 41 until such springs have been moved out of engagement with said gear wheels by the cam 42.

To lock the top 43 in an inoperative position, I provide a lever 86 pivoted upon one side of the casing and which carries a hook 87 which engages a pin 88 which pin works through the longitudinal slot 89 cut in a side of the casing 37. The lever 86 is thrown over from the position shown in Fig. 1 to that shown in Fig. 3, and the hook permits the pin to slide in the slot, which pin it will be understood has its inner end secured to the sliding top 43.

The angle arm 70$^a$ secured to the presser foot 62 and extending past the presser foot 63 engages the underside of the pin 70 and lifts the last mentioned presser foot when the work is done. By regulating the position of the bifurcated block 56 the position of the cutters with respect to the pattern may be changed, as the block 56 can be moved so as to project more or less beyond the extreme end of the block 55, or as shown in Fig. 5, may rest flush with the outer upper portion of said block. The presser feet 62 and 63 serve to hold the work to the cutters as will be readily understood. Prior to first starting the machine the shafts 38 are turned with a wrench, key or handle and the springs 40 connected to the gear wheels 39 are wound up.

What I claim is:—

1. In a device of the kind described, a revolving table, means for holding work centrally and fixedly with respect to the table, a radially movable casing in the table, a longitudinally movable cover in the casing, an arm carried by the casing, and adjustable cutters carried by the arm and operating on the work.

2. A device of the kind described comprising a revolving table, means for supporting work centrally with respect to the table, a casing movable radially upon the table and revolving with it, a rack bar carried by said casing, a spring driven gear wheel engaging said rack bar, a slidable top carried by the casing, a cam block controlling said gear, the said cam block being carried by the top, means for sliding said top independent of movement of the casing, a pivoted frame carried by said top, and cutting mechanism carried by said swinging frame.

3. A device of the kind described comprising a fixed support, a table revolving around said support, a casing radially movable upon said table, a casing top slidable longitudinally on the casing, a vertically arranged frame, said frame swinging in a horizontal plane, trimming and channeling mechanism carried by said frame, means for moving the casing radially upon the table, means for locking said casing against movement, means for sliding the casing top independent of movement of the casing, and means carried by said table for releasing the locking means above mentioned.

4. A device of the kind described comprising a centrally fixed work support, a table revolving around said support, a radially movable frame supported above said table, cutting mechanism carried by said table, a lever for throwing said cutting mechanism into operation, an overhanging beam, a cam carried by the beam, a spring pressed vertically movable foot in position to be engaged and lifted by said cam and a downwardly movable shoe operatively connected to said foot and in position to strike the lever, as and for the purpose set forth.

5. A device of the kind described comprising a work support, a frame movable about said support, a vertically movable cutter block carried by said frame, a cutter carried by said block, an extension carried by the block, a second vertically movable cutter block, a cutter carried by the last mentioned block, a vertically movable link adapted to lift the first mentioned cutter block, a lever operating said link, and adjustable means for locking the second cutter block to the first so that the second mentioned cutter will lift either with or after the first mentioned cutter.

WILLIAM E. SMALL.

Witnesses:
CHAS. E. BROCK,
OLIVER W. HOLMES.